Feb. 6, 1968  R. A. GALLANT  3,367,354

VALVE

Filed Nov. 9, 1964

INVENTOR.
Raymond A. Gallant
BY
A. M. Heiter
ATTORNEY 3,367,354
VALVE
Raymond A. Gallant, Royal Oak, Mich., assignor to General Motors Corporation, Detroit, Mich., a corporation of Delaware
Filed Nov. 9, 1964, Ser. No. 409,627
7 Claims. (Cl. 137—108)

ABSTRACT OF THE DISCLOSURE

A surge pressure relief valve is incorporated in a flow control valve of a hydraulic system to interrupt and directly bypass surge pressure upstream of the flow control valve before transmittal to the downstream side.

---

This invention relates to pressure responsive valves and more particularly to surge pressure relief valves to relieve pressure surges in fluid systems.

Pressure surge in a hydraulic system can cause undesirable system operation and leakage problems if not rapidly relieved. While the pressure relief valve of the prior art have proven generally satisfactory, it has been found that such valves often do not meet the required standards of pressure surge relief especially where such valves are to be incorporated into a system's control valve to provide compact valving requiring no additional external circuitry for surge pressure relief.

While surge pressure relief valves having features of this invention may be used in a wide range of applications, they are especially advantageously employable for rapid pressure surge relief in vehicle power steering systems. For example, severe pressure surges are often experienced upon initial power steering pump operation in cold weather especially in the colder regions of the country. These severe pressure surges which have been found to originate at the pump preferably should be relieved at a very rapid rate.

Briefly stated, the principle of this invention lies in a surge pressure relief valve provided in a pressure-flow control valve of a hydraulic system which provides, in addition to a maximum system pressure relief valve which normally controls the limits of maximum system pressure, a rapid acting pressure relief for pressure surge. Furthermore, this surge pressure relief is effected at a point close to one known primary point of surge origination to interrupt the pressure surge before transmittal to the system's hydraulic circuitry downstream of the pressure-flow control valve.

The rapid acting surge pressure relief valve is illustrated as being employed in a vehicle power steering system and being incorporated in the pressure-flow control valve of such system which controls the supply of fluid discharge from a constant displacement engine driven pump to a power steering motor control valve controlling supply to a power steering assist motor. The pressure-flow control valve has a control valve element opening its pump supplied inlet port to the outlet port and at engine idle and engine speeds reflective of vehicle parking and low speed travel, the outlet port supplies through a flow control orifice all pump discharge to the power steering motor control valve. The orifice has a restricted flow area calibrated to insure only sufficient flow rate for steering assist so that with increasing pump speed, pump discharge in excess of that needed for the system develops a controlling pressure drop across the orifice for biasing control means acting on the control valve element to open to the inlet port a bypass port connected to the pump intake side. In this manner the excess fluid discharged by the pump is recycled through the pump to prevent heat build up and to decrease leakage difficulties in the hydraulic steering system at the higher pump speeds.

The biasing control means include a damping and control chamber for the control valve element connected through a restricted passage to a downstream side of the flow control orifice having a restricted passage restricting flow therebetween to provide a damping effect for the control valve element. Under conditions where flow through the power steering control valve is blocked the resulting pressure buildup transmitted to the damping chamber opens at a predetermined safe system pressure a maximum system pressure relief valve. The latter valve is located in the control valve element to exhaust fluid in the damping chamber to a relief chamber provided in the control valve element which is open to the bypass port when the control valve element is in a position only partially opening the bypass port to the inlet port. This allows the control valve element to move so as to fully uncover the bypass port to the inlet port to provide maximum limit to the pump discharge pressure at the upstream side of the flow control orifice to maintain system pressure at a safe level and also provides relief of any nonsevere pressure surges occurring downstream of the flow control orifice during flow handling by the flow control valve. When severe pressure surge occurs, such as upon engine starting in cold regions, pressure transmittal to the damping chamber to open the maximum system pressure relief valve to permit full uncovering of the bypass port to the inlet port can require too lengthy a response time for the pressure surge relief desired. To rapidly relieve this severe surge pressure, there is provided in the control valve element a pressure surge relief valve for directly connecting the inlet port through the relief chamber to the bypass port thereby directly bypassing the surge pressure and preventing its further transmittal downstream. The surge pressure relief valve, which is normally held closed by biasing means also normally holding closed the maximum system pressure relief valve, has a pressure reaction area smaller than that of the maximum system pressure relief valve so that the surge pressure valve opens at a pressure higher than the maximum system pressure relief valve and at surge pressures above the maximum pump discharge pressure limit normally maintained by the control valve.

An object of this invention is to provide in a hydraulic system's control valve a pressure responsive relief valve to directly relieve severe pressure surge.

Another object of this invention is to provide a pressure relief valve incorporated in a flow control valve of a hydraulic system to rapidly relieve pressure surge to prevent pressure surge transmittal past the flow control valve to the downstream circuitry.

Another object of this invention is to provide a severe surge pressure relief valve in the flow control valve of a hydraulic system which provides in addition to a relief valve normally controlling maximum system pressure a rapid acting pressure relief for severe pressure surge with surge pressure relief at a point intermediate the point of surge origination and the downstream system supplied by the flow control valve.

Another object of this invention is to provide in a power steering system supplied by a constant displacement variable speed pump a pressure responsive flow control valve having a valve element controlling, in response to pressure drop across a flow control orifice supplying the downstream system, bypass flow from the pump discharge side to the pump intake side to provide maximum limit to the pressure upstream of the orifice and a relief valve directly responsive to pump discharge pressure upstream of the orifice to directly bypass severe surge pressure from the upstream side of the orifice and the pump discharge side to the pump intake side to prevent pressure surge transmittal to the system circuitry downstream of the orifice.

Another object of this invention is to provide in a power steering system supplied by a constant displacement vehicle engine driven pump a pressure-flow control valve having an inlet connected to the discharge side of the pump, an outlet connected through a flow control orifice to the power steering control valve and a bypass port connected to the pump intake side with the flow control valve opening the outlet port to the inlet port for pump discharge and connecting the pump discharge and intake sides whenever the discharge of the pump is in excess of an adequate system supply determined by the orifice with system pressure downstream of the orifice being communicated through a flow restriction to biasing control means acting to control the flow control valve including a control chamber to provide a damping effect for control valve motion, the control valve having a maximum system pressure relief valve to communicate the control chamber with the pump intake side to enable full opening of the bypass port to normally limit maximum pump discharge and system pressure and a severe pressure surge relief valve operable in response to severe system pressure surge in a pressure range exceeding the normal pump discharge pressure limit to directly exhaust the pump discharge side from the inlet port via the bypass port to the pump intake side.

These and other objects of the invention will be more apparent from the following description and drawing in which.

Figure 1:
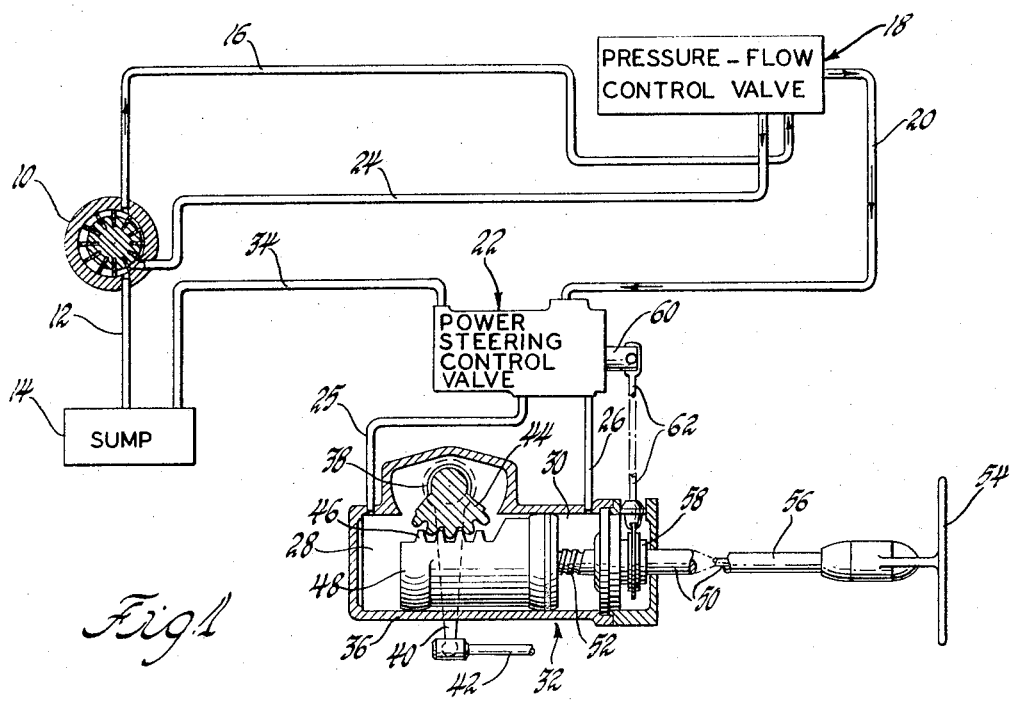
FIGURE 1 is a diagrammatic view showing a vehicle power steering system employing a pressure-flow control valve having pressure surge relief means embodying features of this invention.

Referring first to FIGURE 1, the numeral 10 denotes a constant displacement vane type pump which in the application of the system to an automotive vehicle would normally be driven by the engine crankshaft. Pump 10 when driven draws on its intake side via an intake conduit 12, fluid from a collecting sump 14 and discharges this fluid under pressure on its discharge side to a discharge conduit 16 for delivery to a pressure-flow control valve 18.

Pressure-flow control valve 18 controls the pressure and flow in a conduit 20 connected to deliver fluid to a power steering control valve 22 and bypasses overage via an exhaust or bypass conduit 24 to the intake side of pump 10, the description of structure and operation of valve 18 being described in greater detail later. Fluid in conduit 20 is delivered by power steering control valve 22 under controlled conditions through motor supply conduits 25 and 26 to the motor chambers 28 and 30 of a power steering assist motor 32 to provide power assist for steering with fluid return being via a conduit 34 to sump 14.

Motor 32 including motor chambers 28 and 30 is housed in a casing or gear box 36 of generally cylindrical conformation having disposed therein and extending at one side thereof a cross or rock shaft 38 connected externally of the casing with a pitman arm 40 through which a drag link 42 is actuated. The linkage beyond the drag link 42 to the steering dirigible wheels may be assumed as conventional.

Integral with rock shaft 38 within the casing 36 is a gear sector 44, the teeth of which mesh with those of a rack 46 formed integral with a piston 48 reciprocal within the casing and having opposed reaction surfaces exposed to motor chambers 28 and 30.

It is well understood by those familiar with this art rotary motion of the steering shaft 50 is translated through its one end 52, which has a helical ball nut connection with piston 48, into reciprocal movement of the piston 48. This results in rocking motion of the pitman arm 40, the direction of movement of the nut and connected piston being determined by the direction of rotation of the steering wheel 54 fixed to the upper end of steering shaft 50. For a full description of motor 32 including its helical ball connection to the steering shaft reference is made to United States Patent No. 2,936,643 granted May 17, 1960, inventors Henry S. Smith and Guy W. Wesson.

Shaft 50 is shown as surrounded mediate the wheel 54 and casing 36 by the usual tubular column or jacket 56. At its lower end shaft 50 is mounted in a thrust bearing 58 supported in casing 36. The valve housing of valve 22 is firmly secured to casing 36 to prevent relative movement and includes a spool valve element 60 having an extension actuated through a pivotal linkage arrangement 62 by limited axial movement of the steering shaft 50. Valve 22 may be of the "open-center" type such as that shown in United States Patent No. 2,929,364 granted Mar. 22, 1960, inventor Ludwig A. Gribler.

As well understood in the art, any substantial resistance of the rock shaft 38 to turning will result in a reactionary thrust force on shaft 50 tending to impart axial movement thereto, the movement being leftward in the case of a right turn, rightward in the case of a left turn. It is this reactionary axial movement which is utilized to bring about automatic operation through pivotal linkage 62 and the connected valve element 60 to control flow through the motor supply conduits 25 and 26 to the motor chambers 28 and 30 respectively to act on piston 48 to provide power assist. If the spool valve element 64 is displaced to the right in the case when the steering shaft reacts axially leftwardly on a right turn, the valve 22 by its valve gap produces a build up of pressure in motor chamber 28 providing the desired power assist. When the spool valve element 60 is displaced to the left the effect is just the reverse of that described and provides the desired power assist for a left-hand turn by pressure build up in motor chamber 30.

Since the pump 10 is normally driven by the engine of the vehicle, the pump thus operates at all times when the vehicle engine is running and the speed of operation of the pump is directly proportional to the engine speed. To prevent heat build up in the hydraulic system and fluid sealing problems which would otherwise occur at high engine speeds as a consequence of increasing pump discharge pressure in conduit 16, the pressure-flow control valve 18 is provided to connect the pump discharge and intake sides whenever the pump discharge rate is in excess of that needed to insure proper power steering operation.

Pressure-flow control valves of the prior art have generally not responded rapidly enough as desired to relieve severe surge pressures at the pump discharge side, such undesirable surge pressures having been observed on engine starting particularly where the power steering system is operated in the colder regions of the country.

Figure 2:
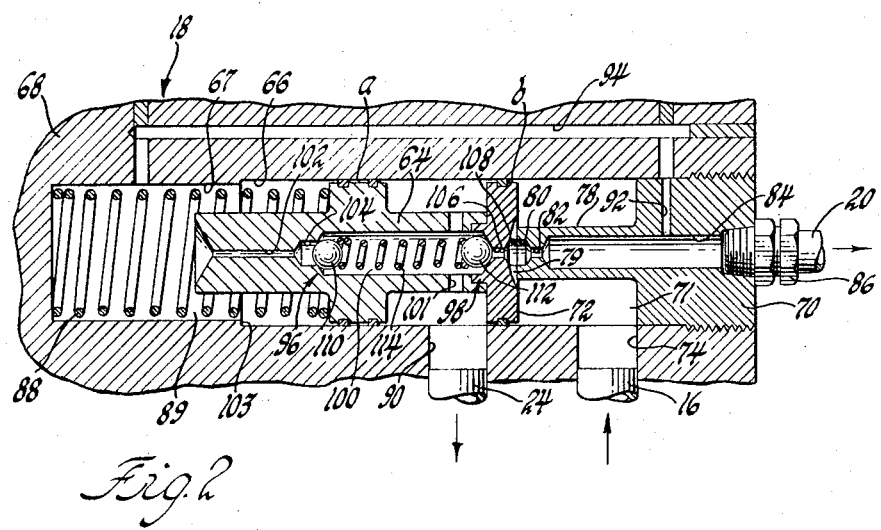
FIGURE 2 is an enlarged sectional view taken through the pressure-flow control valve of FIGURE 1.

According to this invention, the pressure-flow control valve 18, as best shown in FIGURE 2, is provided with a control spool valve element 64 having equal diameter lands $a$ and $b$ provided with suitable seals slidably mounted in a counterbore 66 which is an enlargement of bore 67 in the valve body 68. Valve body 68 is preferably constructed integral with the pump housing of pump 10 to provide a compact arrangement of these structures. An end plug 70 threadedly secured in the right-hand end of counterbore 66 in cooperation with valve body 68 and end face 72 of valve element 64 delineates a flow control chamber 71. An inlet port 74 connects chamber 71 to the pump discharge conduit 16 so that the reaction surface provided by end face 72 of control valve element 64 is available to pump discharge pressure. Plug 70 has a stem 78 in the end of which is provided an outlet port 80 which is connected through a flow control orifice 82 to the valve outlet passage 84, the latter being connected by a coupling fixture 86 to the conduit 20. A prestressed spring 88 located in a damping and control chamber 89 exposing the left-hand end of valve element 64 urges the latter rightwardly to engage the end face 72 of the valve element with the left-hand end of valve stem 78 as shown. In this valve element position a groove 79 in end face 72 connects chamber 71 and connected inlet port 74 to the outlet port 80. An exhaust or bypass port 90 connected to bypass conduit 24 when uncovered by land $b$ provides for fluid bypass flow from chamber 71 to the intake side of pump 10. The outlet passage 84 downstream of flow control orifice 82 is connected via a restricted passage 92 and a passage 94 to chamber 89, the restricted passage 92 providing a restriction to fluid flow to control the rate of pressure build-up and decay in chamber 89 to obtain a damping effect on control valve element motion.

Control valve element 64 contains both a maximum system pressure relief valve assembly 96 and a surge pressure relief valve assembly 98, the operating parts of such valve assemblies being accommodated in a central relief chamber 100 provided in control valve element 64. The chamber 100 is connectible at its left-hand end with chamber 89 via a passage 102 and a valve port 104 and is at its right-hand end connectible with chamber 71 via a valve port 106 and a connecting port 108 in line with the outlet port 80 in stem 78. Chamber 100 is connectible between lands $a$ and $b$ via radial ports 101 to the bypass port 90 in all positions of control valve element 64 except its fully open bypass position, the left-hand edge of land $a$ being arranged to bottom out on the step 103 of counterbore 66 at which position land $b$ fully opens bypass port 90 to chamber 71 and closes the bypass port 90 to the annular space between lands $a$ and $b$. Mounted in chamber 100 is a ball 110 engageable with the valve seat provided by the valve port 104 for valve assembly 96 and a ball 112 engageable with the valve seat provided by the valve port 106 for valve assembly 98. Arranged between balls 110 and 112 is a prestressed spring 114 which urges both balls 110 and 112 towards their respective valve seats to complete the valve assemblies.

To describe the normal operation of the pressure-flow control valve 18, let it be assumed that pump 10 is being driven at a slow speed corresponding to a vehicle engine speed of idle or slightly faster, as occurs during parking or tight maneuvering which is when maximum steering resistance is encountered. Under these conditions, the control valve element 64 remains in the position shown and the entire pump discharge passes through the groove 79 and port 80 to the flow control orifice 82 for delivery to the power steering control valve 22 to provide power assist in accordance with the operation of the latter valve. Upon delivery of fluid through orifice 82 and the connected outlet passage 84 fluid pressure is also transmitted through restricted passage 92 to chamber 89, such pressure being lower than that in chamber 71 since there is maintained at these low pump speeds a significant pressure drop between chamber 71 and the downstream side of flow control orifice 82. Now upon speeding up of the vehicle engine and consequently of the pump 10 and provided the system pressure downstream of flow control orifice 82 remains substantially constant, the pressure drop across the flow control orifice 82 also increases because of increasing pump discharge flow and pressure. The flow control orifice 82 is carefully calibrated so that at a predetermined adequate flow rate to the system, this pressure drop as reflected in resulting pressure differential between chambers 71 and 89 provides a pressure imbalance acting on control valve element 64 to urge the latter leftwardly from the position shown against the bias of spring 88 causing land $b$ to gradually uncover bypass port 90 to chamber 71.

Fluid in chamber 89 upon leftward valve element movement is forced through passage 94 and restricted passage 92 to the outlet passage 84 and with bypass port 90 being partially uncovered to chamber 71 the excess pump discharge is bypassed to the pump intake side thereby relieving pressure build-up on the pump discharge side and in addition providing a supercharging effect at the pump intake side to prevent fluid cavitation at this point.

With continued increasing pump speed and pump discharge and with the system pressure still remaining substantially constant downstream of flow control orifice 82 the land $b$ opens wider the bypass port 90 to chamber 71 for bypass flow until land $a$ eventually bottoms out on step 103 fully uncovering bypass port 90 to chamber 71 for maximum bypass flow in the higher pump speed ranges. The bypass flow permitted in the higher pump speed ranges by the uncovering of bypass port 90 to chamber 71 is made adequate to limit pump discharge pressure build-up in chamber 71 and therefore pressure communicated to the system downstream of the flow control orifice 82 to a predetermined maximum safe pressure range, for example 970 p.s.i.±65 p.s.i.

During steering operation in the lower pump speed ranges where land $b$ only partially uncovers bypass port 90 to chamber 71, the annular space between lands $a$ and $b$ is connected to bypass port 90 for system pressure relief should a pressure build up occur in the system downstream of flow control orifice 82 because of flow blockage by the power steering control valve 22 during a steer operation. Upon such a system pressure build up occurring, the maximum system pressure relief valve 96 operates to limit such system pressure build ups to the maximum safe pressure range when the bypass port 90 is only partially open to chamber 71 at the occurrence of such system pressure build up. The pressure reaction surface of valve 96 as determined by the area of valve port 104 exposing ball 110 to the pressure in chamber 89 and the bias of spring 114 are calculated so that a system pressure in the 970 p.s.i. ±65 p.s.i. range, used as an example, when transmitted to chamber 89 via restricted passage 92 and passage 94 operates to open valve 96. As valve 96 opens, fluid pressure in chamber 89 is exhausted through relief chamber 100, ports 101 and between lands $a$ and $b$ to bypass port 90 and the pump intake side, bypass port 90 being open to both chamber 71 and the annular space between lands $a$ and $b$ under these conditions. This pressure exhaust allows control valve element 64 to move leftwardly to fully open bypass port 90 to chamber 71 should that be required to bypass pump discharge and bring the system pressure back down to the maximum pressure range of 970 p.s.i. ±65 p.s.i.

There may occur a severe surge pressure in chamber 71 exceeding the maximum 970 p.s.i. ±65 p.s.i. pressure range during normal operating conditions or when the vehicle engine is initially started accelerating the pump, recognizing the system's circuitry will remain substantially full of hydraulic fluid during pump shutdown. In that event if the pressure communication to chamber 89 to open the maximum system pressure relief valve 96 is not fast enough for the required control valve element response, the surge pressure relief valve will open when the bypass port 90 is closed or partially open to chamber 71 to allow direct communication between chamber 71 and bypass port 90 through this valve's fluid circuitry which includes the relief chamber 100, ports 101 and the annular space between lands *a* and *b*. This highly desirable direct relief of severe surge pressure is accomplished by having the pressure reaction surface of valve 98 as determined by the area of valve port 106 exposing ball 112 to the pressure in chamber 71 made sufficiently smaller than the pressure reaction surface of valve 96. Thus, when pressure in chamber 71 suddenly exceeds the aforementioned predetermined maximum pressure range of 970 p.s.i. ±65 p.s.i. such excessive sudden pressure operates directly to open valve 98 as distinguished from valve 96 which opens after a delay interval because of the flow restrictions upstream of its reaction surface. Then upon relief of the surge pressure, valve 98 closes and the pressure flow control valve 18 is again conditioned for normal operating power steering conditions.

The above-described preferred embodiment is illustrative of the invention which may be modified within the scope of the appended claims.

I claim:

1. In a control valve assembly for controlling the supply from a variable fluid pressure and supply source to a system,
   (a) a control valve having an inlet port for connection to the variable fluid pressure and supply source, an outlet port operatively connected to said inlet port, an exhaust port, a flow control orifice for connecting said outlet port to the system and operating valve means including a valve element operable in a minimum pressure range occurring at said inlet port to close said exhaust port to said inlet port so that said flow control orifice delivers all available fluid supply at said inlet port to the system and at a predetermined pressure drop across said flow control orifice occurring in higher pressure ranges and increased fluid supply at said inlet port to subsequently gradually open said exhaust port to said inlet port to exhaust the excess fluid supply at said inlet port to said exhaust port over that required to maintain a minimum flow rate through said flow control orifice to the system and to limit pressure at said inlet port to a maximum pressure range,
   (b) and surge pressure relief valve means connected to said inlet port upstream of said flow control orifice operable to open said inlet port directly to said exhaust port when said valve element closes said exhaust port to said inlet port and there occurs a rapid build up of pressure at said inlet port exceeding the maximum pressure range normally controlled by said valve element.

2. In a control valve assembly for controlling the supply from a variable fluid pressure and supply source to a system,
   (a) a valve body having an inlet port for connection to the variable fluid pressure and supply source, an outlet port operatively connected to said inlet port, an exhaust port and a flow control orifice for connecting said outlet port to the system,
   (b) a valve element mounted in said valve body for sliding movement operable to open and close said exhaust port to said inlet port,
   (c) biasing means urging said valve element in a valve closing direction towards a closed position to close said exhaust port to said inlet port and yieldingly resisting valve element movement in a valve opening direction from said closed position,
   (d) said valve element having opposed pressure reaction surfaces, means providing a first chamber exposing one of said pressure reaction surfaces connected to said inlet port, means providing a second chamber exposing the other pressure reaction surface, passage means including flow restriction means for connecting said second chamber to the system at a point downstream of said flow control orifice for restricting flow between said second chamber and the system downstream of said flow control orifice whereby said flow restriction means restricts flow to provide a damping effect on valve element movement, said valve element in a minimum pressure range occurring at said inlet port closing said exhaust port to said inlet port so that said flow control orifice delivers all available fluid supply at said inlet port to the system and said valve element being responsive at a predetermined pressure drop across said flow control orifice occurring in higher pressure ranges and at increased fluid supply at said inlet port to subsequently gradually open said exhaust port to said inlet port to exhaust the excess fluid supply at said inlet port to said exhaust port over that required to maintain a minimum flow rate through said flow control orifice to the system and to limit pressure at said inlet port to a maximum pressure range,
   (e) and surge pressure relief valve means wholly contained in said valve element operable to immediately open said inlet port directly to said exhaust port when said valve element closes said exhaust port to said inlet port in direct response to a rapid build up of pressure at said inlet port exceeding the maximum pressure range normally controlled by said valve element.

3. In a control valve assembly for controlling the supply from a variable fluid pressure and supply source to a system,
   (a) a flow control valve having an inlet port for connection to the variable fluid pressure and supply source, an outlet port operatively connected to said inlet port, a flow control orifice for connecting said outlet port to the system and an exhaust port, said flow control valve having a control valve element closing said exhaust port to said inlet port in a minimum pressure range occurring at said inlet port and being operable to open said exhaust port to said inlet port at a predetermined pressure drop occurring across said flow control orifice to exhaust the excess fluid supply during increasing fluid pressure and supply at said inlet port in excess of that required to maintain a minimum flow rate through said flow control orifice to the system and to limit the fluid pressure at said inlet port to a maximum pressure range,
   (b) and surge pressure relief valve means including passage means connected to said inlet port upstream of said flow control orifice for directly connecting said inlet port to said exhaust port when said exhaust port is fully closed to said inlet port by said control valve element and having a valve reaction surface exposed to fluid pressure at said inlet port and further having biasing means yieldingly holding said surge pressure relief valve means closed only below said maximum pressure range at said inlet port so that surge pressures occurring at said inlet port above said maximum pressure range act fully and directly to open said surge pressure relief valve means to directly connect said inlet port to said exhaust port to relieve such surge presures when said exhaust port is closed to said inlet port by said control valve element and upon relief of such surge pressures said surge pressure relief valve means closes to recondition said control valve for maintaining said maximum pressure range at said inlet port.

4. In a control valve assembly,
   (a) a valve body providing an inlet port, an outlet port operatively connected to said inlet port and having a flow control orifice, an exhaust port and a pair of chambers, a valve member mounted in said valve body for sliding movement having opposed reaction surfaces for fluid reaction exposed to said chambers and being operable to open and close said exhaust port to one of said chambers, said inlet port being connected to said one chamber and passage means including a flow restriction connecting said outlet port downstream of said flow control orifice to the other chamber, (b) spring means mounted in said other chamber prestressed to urge said valve member towards a closed position closing said exhaust port to said one chamber and said valve member being movable in response to increasing pressure drop occurring across said flow control orifice from said closed position against said spring means to gradually open said exhaust port to said one chamber, (c) and said valve member having pressure relief means including a relief chamber provided in said valve member connected to said exhaust port when said valve member closes said exhaust port to said one chamber and partially opens said exhaust port to said one chamber, a first relief valve contained in said valve member having a first relief valve element providing a first pressure reaction area exposed to said other chamber and being operable to open and close said other chamber to said relief chamber, a second relief valve having a second relief valve element providing a second pressure reaction area for exposure to said one chamber operable to open and close said one chamber to said relief chamber, spring means mounted in said relief chamber and arranged between said first and second relief valve elements prestressed to urge both said first and second relief valve elements to close both said one chamber and said other chamber to said relief chamber and yieldingly resisting first and second relief valve element movement to open said one chamber and said other chamber respectively to said relief chamber and said first pressure reaction area being larger than said second pressure reaction area so that said second relief valve opens in response to a pressure higher than the pressure necessary to open said first relief valve.

5. In combination with a constant displacement pump operating at varying speeds and receiving fluid on a pump intake side and discharging the fluid under pressure on a pump discharge side for delivery to a downstream system, (a) a control valve including a flow control orifice continuously connecting the pump discharge side through said flow control orifice to the system and being responsive to a selected pressure drop across said flow control orifice to connect the pump discharge side to the pump intake side for bypass to the pump intake side of the excess fluid supplied from the pump discharge side in excess of that required to maintain a minimum flow rate through said flow control orifice to the system and to limit the pressure at the pump discharge side to a maximum pressure range, (b) and said control valve having surge pressure relief valve means connected to said pump discharge side upstream of said flow control orifice directly responsive to pump discharge pressure upstream of said flow control orifice operable in response to surge pressures occurring on the pump discharge side and in a pressure range exceeding said maximum pressure range to connect the pump discharge side to the pump intake side irrespective of the instant pressure downstream of said flow control orifice when said control valve is closing the pump discharge side to the pump intake side and also when said control valve is only partially opening the pump intake side to the pump discharge side.

6. In combination with a constant displacement pump operating at varying speeds and receiving fluid on a pump intake side and discharging the fluid under pressure on a pump discharge side for delivery to a system, (a) a control valve for connecting the pump discharge side to the system and the pump intake side and including a valve element having opposed reaction surfaces for fluid pressure reaction, means providing a first chamber to which one of said reaction surfaces is exposed and to which the pump discharge side is connected, said valve element being operable to open and close the pump intake side to said first chamber, a flow control orifice connecting said first chamber to the system, means providing a second chamber to which the other reaction surface is exposed, biasing means biasing said valve element towards a closed position to close the pump intake side to said first chamber, passage means connecting the system at a point downstream of said flow control orifice to said second chamber, said valve element when subjected at said reaction surfaces to the pressures in said chambers remaining in said closed position in a selected pump discharge range and upon a predetermined pressure drop occurring across said flow control orifice when the selected pump discharge range is being exceeded, the resulting pressure differential between said first and second chambers acting to move said valve element to gradually open said first chamber and connected pump discharge side to the pump intake side with increasing pressure drop above said predetermined pressure drop until eventually said first chamber and connected pump discharge side are fully open to the pump intake side to provide a maximum pressure limit to the pressure in said first chamber and connected pump discharge side, (b) said valve element having a relief chamber connected to the pump intake side when said first chamber and connected pump discharge side are closed to the pump intake side and also when said first chamber and the connected pump discharge side are partially open to the pump intake side, a maximum system pressure relief valve mounted in said valve element operable to open said second chamber to said relief chamber when the pressure in the system exceeds said maximum pressure limit and said valve element is only partially opening said first chamber and connected pump discharge side to the pump intake side so that said second chamber is exhausted to the pump discharge side to enable said valve element to move against said biasing means to fully open said first chamber and connected pump discharge side to the pump intake side, (c) and a surge pressure relief valve mounted in said valve element operable to open said first chamber to said relief chamber for exhaust to the pump intake side whenever the pressure in said first chamber suddenly exceeds said maximum pressure limit so that severe surge pressures occurring on the pump discharge side in a pressure range exceeding said maximum pressure range are exhausted to the pump intake side when said first chamber and connected pump discharge side are closed to the pump intake side and partially opened to the pump intake side to prevent such surge pressures from being transmitted past said control valve to the system.

7. In combination with a constant displacement pump operating at varying speeds and receiving fluid on a pump intake side and discharging the fluid under pressure on a pump discharge side for delivery to a downstream system, (a) a pressure responsive control valve continuously opening the pump discharge side to the downstream system and maintaining the pump intake side closed to the pump discharge side in a maximum pump discharge pressure range and being responsive to increasing pump discharge pressure past said minimum pump discharge pressure range to gradually open the pump intake side to the pump discharge side to bypass flow from the pump discharge side to the pump intake side to limit the pump discharge pressure to a maximum pump discharge pressure range higher than said minimum dump discharge pressure range, (b) and said pressure responsive control valve having surge pressure relief valve means operable in response to surge pressures occurring on the pump discharge side prior to their transmittal past said pressure responsive control valve to said downstream system and in a pressure range exceeding said maximum pump discharge pressure range to connect the pump discharge side to the pump intake side for surge pressure relief to prevent transmittal of such surge pressures to the downstream system when said pressure responsive control valve closes the pump intake side to the pump discharge side.

References Cited

UNITED STATES PATENTS 2,996,013   8/1961   Thompson _____ 137—108

WILLIAM F. O'DEA, Primary Examiner.

H. M. COHN, Assistant Examiner.

UNITED STATES PATENT OFFICE
CERTIFICATE OF CORRECTION

Patent No. 3,367,354                  February 6, 1968

Raymond A. Gallant

It is hereby certified that error appears in the above numbered patent requiring correction and that the said Letters Patent should read as corrected below.

Column 1, line 23, for "valve" read -- valves --; column 2, line 12, for "a" read -- the --; line 17, after "resulting" insert -- system --; column 10, line 62, for "maximum" read -- minimum --; line 71, for "dump" read -- pump --.

Signed and sealed this 3rd day of June 1969.

(SEAL)
Attest:

Edward M. Fletcher, Jr.

Attesting Officer

Commissioner of Patents